(12) United States Patent
Blea et al.

(10) Patent No.: US 9,672,124 B2
(45) Date of Patent: Jun. 6, 2017

(54) ESTABLISHING COPY PAIRS FROM PRIMARY VOLUMES TO SECONDARY VOLUMES IN MULTIPLE SECONDARY STORAGE SYSTEMS FOR A FAILOVER SESSION

(71) Applicant: International Business Machines Corporation, Armonk, NY (US)

(72) Inventors: David R. Blea, Round Rock, TX (US); Susan K. Candelaria, Tucson, AZ (US); Nicolas M. Clayton, Warrington (GB); Lisa J. Gundy, Tucson, AZ (US); Tri M. Hoang, Poughkeepsie, NY (US); Bengt E. Larsson, Karlstad (SE); William J. Rooney, Hopewell Junction, NY (US); Michael J. Shannon, Honesdale, PA (US); Corey G. Smeaton, Somerville, MA (US); Warren K. Stanley, Loveland, CO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 271 days.

(21) Appl. No.: 14/304,479

(22) Filed: Jun. 13, 2014

(65) Prior Publication Data

US 2015/0363286 A1    Dec. 17, 2015

(51) Int. Cl.
G06F 11/00    (2006.01)
G06F 11/20    (2006.01)
G06F 11/16    (2006.01)

(52) U.S. Cl.
CPC ...... *G06F 11/2069* (2013.01); *G06F 11/2058* (2013.01); *G06F 11/1666* (2013.01); *G06F 11/2094* (2013.01)

(58) Field of Classification Search
CPC combination set(s) only.
See application file for complete search history.

(56) References Cited

U.S. PATENT DOCUMENTS 5,559,764 A    9/1996    Chen et al.
6,148,412 A    11/2000   Cannon et al.
(Continued)

OTHER PUBLICATIONS

R. Schulman, "Disaster Recovery Issues and Solutions", Hitachi Data Systems White paper, Sep. 2004, pp. 23.
(Continued)

*Primary Examiner* — Bryce Bonzo
*Assistant Examiner* — India Davis
(74) *Attorney, Agent, or Firm* — David W. Victor; Konrad Raynes Davda & Victor LLP

(57) ABSTRACT

Provided are a computer program product, system, and method for establishing copy pairs from primary volumes to secondary volumes in multiple secondary storage systems for a failover session. For each of the copy pairs, data is mirrored from the primary storage system to the associated secondary storage system in the copy pair. A failure is detected at the primary storage system. Selection is made of a selected secondary storage system of the secondary storage systems in response to detecting the failure, wherein a plurality of the secondary storage systems are available for selection. The selected secondary storage system is indicated as a new primary storage system to which host requests are directed.

17 Claims, 7 Drawing Sheets

(56) References Cited

U.S. PATENT DOCUMENTS

| | | |
|---|---|---|
| 7,085,956 B2 | 8/2006 | Petersen et al. |
| 7,542,986 B2 | 6/2009 | Lubbers et al. |
| 7,941,602 B2 | 5/2011 | Burkey |
| 8,261,033 B1 | 9/2012 | Slik et al. |
| 8,543,742 B2 | 9/2013 | Yu et al. |
| 2010/0229047 A1* | 9/2010 | Mikami ............... G06F 11/324 714/46 |
| 2013/0132693 A1* | 5/2013 | Kondo ............... G06F 11/1456 711/162 |

OTHER PUBLICATIONS

N. Maki, et al., "A Proposal of Management Interface for Differential Data Exchange Mechanism on 3 Datacenter Storage Systems", Electrical Engineering/Electronics, Computer, Telecommunications and Information Technology, 2009, pp. 4.

"IBM HyperSwap Technology—IBM ATS Storage", IBM Corporation, Aug. 2013, pp. 22.

* cited by examiner

ESTABLISHING COPY PAIRS FROM PRIMARY VOLUMES TO SECONDARY VOLUMES IN MULTIPLE SECONDARY STORAGE SYSTEMS FOR A FAILOVER SESSION

BACKGROUND OF THE INVENTION

1. Field of the Invention

The present invention relates to a computer program product, system, and method for establishing copy pairs from primary volumes to secondary volumes in multiple secondary storage systems for a failover session.

2. Description of the Related Art

Failover programs, such as International Business Machine Corporation's ("IBM") HyperSwap® which is a function in the z/OS® operating system, provides continuous availability for disk failures by maintaining synchronous copies of all primary disk volumes on one or more primary storage systems to one or more target (or secondary) storage systems. (HyperSwap is a registered trademark of IBM in countries throughout the world). When a disk failure is detected, code in the operating system identifies HyperSwap managed volumes and instead of failing the I/O request, HyperSwap switches (or swaps) information in internal control blocks so that the I/O request is driven against the secondary volume. Since the secondary volume is an identical copy of the primary volume prior to the failure, the I/O request will succeed with no impact to the program issuing the I/O request, which could be an application program or part of the operating system. This therefore masks the disk failure from the program and avoids an application and/or system outage. An event which causes a HyperSwap to be initiated is called a "swap trigger".

Periodically HyperSwap checks the environment including the I/O configuration to assure that no changes have occurred such that a HyperSwap is no longer possible. If there exists a problem in the configuration HyperSwap will indicate that it is either running in degraded mode or it may become completely disabled. In either case, if a HyperSwap occurred after the problem was detected some or all of the systems in the sysplex (or computing cluster) may not be able to HyperSwap. When this happens the programs accessing the effected devices will fail which often means the entire system or sysplex will fail.

When a swap trigger is detected, HyperSwap first verifies that the target configuration is still viable by running the check one last time. If the configuration is still viable then the HyperSwap proceeds. Otherwise, if invalid, depending on policy, the HyperSwap is either terminated and backed out if required or systems that cannot proceed with the HyperSwap are partitioned out of the sysplex in an attempt to allow other systems in the sysplex to complete the HyperSwap.

SUMMARY

Provided are a computer program product, system, and method for establishing copy pairs from primary volumes to secondary volumes in multiple secondary storage systems for a failover session. For each of the copy pairs, data is mirrored from the primary storage system to the associated secondary storage system in the copy pair. A failure is detected at the primary storage system. Selection is made of a selected secondary storage system of the secondary storage systems in response to detecting the failure, wherein a plurality of the secondary storage systems are available for selection. The selected secondary storage system is indicated as a new primary storage system to which host requests are directed.

DETAILED DESCRIPTION

Described embodiments provide techniques for mirroring primary volumes in a primary storage system to multiple secondary storage systems, so that each primary volume in the primary storage system is copied to multiple secondary storage systems to be available if there is a failure at the primary storage system to increase the likelihood of surviving a primary storage failure. A failover preference may specify a preference ordering of the secondary storage systems to use as the new primary storage system in the event the current primary storage system fails. The other available secondary storage systems not selected to become the primary storage system may then provide secondary storage for the new primary storage system.

Figure 1:
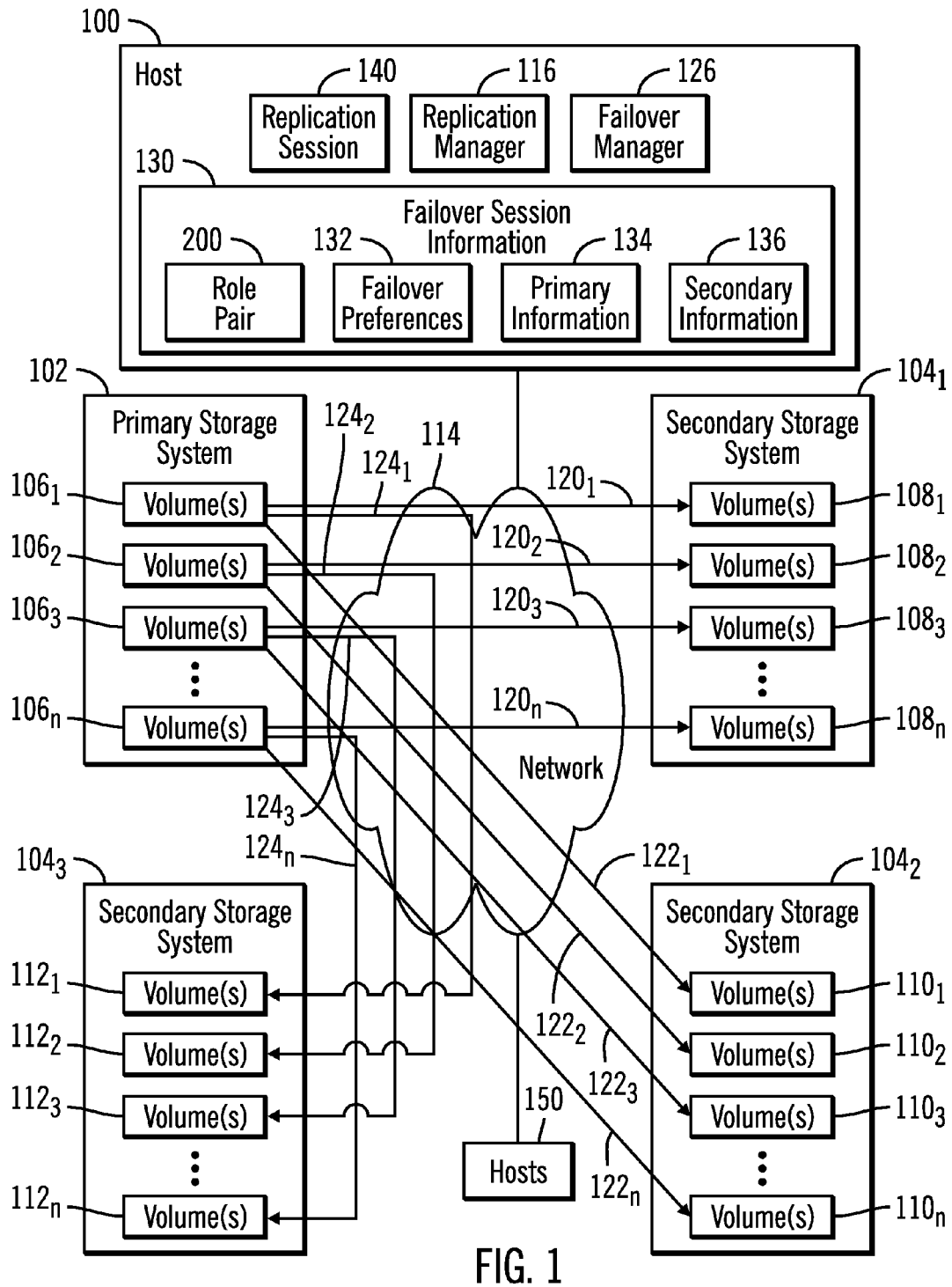
FIG. 1 illustrates an embodiment of a storage replication environment.

FIG. 1 illustrates an embodiment of a mirror copy storage environment having a host system 100 that is connected to a primary storage system 102 and a plurality of secondary storage systems $104_1$, $104_2$, $104_3$ to which data from the primary storage system 102 is mirrored. The primary storage system 102 includes a plurality of volumes $106_1$, $106_2$, $106_3$, and $106_n$ that are in copy pairs with corresponding volumes $108_1$, $108_2$, $108_3$, and $108_n$, $110_1$, $110_2$, $110_3$, and $110_n$, and $112_1$, $112_2$, $112_3$, and $112_n$ in the secondary storage systems $104_1$, $104_2$, $104_3$. Host systems 100, 150 may access data in the currently indicated primary volumes for customer use and access. The hosts 100, 150, primary storage system 102 and secondary storage systems $104_1$, $104_2$, $104_3$ may communicate over a network 114.

The host system 100 includes a replication manager 116 to establish mirror copy relationships identified in role pairs 200. Each of the role pairs 200 includes a plurality of copy pairs, each copy pair associating one of the primary volumes $106_1$, $106_2$, $106_3$, and $106_n$ in the primary storage system 102 with one of the secondary volumes $108_1$, $108_2$, $108_3$, and $108_n$, $110_1$, $110_2$, $110_3$, and $110_n$, and $112_1$, $112_2$, $112_3$, and $112_n$ in one of the secondary storage systems $104_1$, $104_2$, $104_3$, respectively. Thus, a role pair comprises a plurality of copy pairs of primary volumes to secondary volumes in one of the secondary storage systems $104_1$, $104_2$, $104_3$. If the secondary storage system $104_1$, $104_2$, $104_3$ is comprised of a plurality of separate storage sub-systems, then the role pair 200 would include copy pairs indicating secondary volumes in different storage sub-subsystems of the larger secondary storage system component. In a further embodiment, the storage sub-systems may comprise logically partitioned sub-system of a physical storage system.

The role pairs 200 comprise copy pairs with replication paths $120_1, 120_2, 120_3 \ldots 122_n, 122_1, 122_2, 122_3 \ldots 122_n$, and $124_1, 124_2, 124_3 \ldots 124_n$ between the primary volumes $106_1, 106_2, 106_3$, and $106_n$ and the secondary volumes $108_1, 108_2, 108_3$, and $108_n$, $110_1, 110_2, 110_3$, and $110_n$, or $112_1, 112_2, 112_3$, and $112_n$, respectively, showing where the data in the primary volumes is mirrored to the secondary volumes in one of the secondary storage systems. There may be multiple role pairs 200 for a replication session 140, one role pair for each of the secondary storage systems $104_1, 104_2, 104_3$ to which the primary volumes are replicated. The replication manager 116 may provide the role pairs 200 for the secondary storage systems $104_1, 104_2, 104_3$ to which the primary volume data is mirrored to a failover manager 126 to use to implement a failover from the primary storage system 102 to one of the secondary storage systems $104_1, 104_2, 104_3$ in response to a failure event.

The failover manager 126 maintains failover session information 130, which includes the role pairs 200 from the replication manager 116; failover preferences 132 that may comprise a user selected preference order for selecting one of the secondary storage systems $104_1, 104_2, 104_3$ to failover to from the primary storage system 102; and primary 134 and secondary 136 information having information used to access the primary 102 and secondary storage systems $104_1, 104_2, 104_3$.

In one embodiment, the hosts 150 may each have an instance of the failover manager 126 and maintain a copy of the same failover session information 130, so that each host could separately implement a failover. Further, the failover manager 126 on each host allows the hosts 100, 150 to coordinate with peers a failover. However, in certain embodiments only one host 100 maintains a replication manager 116.

In the embodiment of FIG. 1 three secondary storage systems $104_1, 104_2, 104_3$ are shown. However, in different implementations there may be at least two secondary storage systems and more than three secondary storage systems. Further, there may be more or fewer primary and secondary volumes than shown. The user may select an order of the secondary storage systems $104_1, 104_2, 104_3$ in the failover preferences 132 based on proximity to the primary storage system 102, so that those secondary storage systems $104_1, 104_2, 104_3$ closest to the primary storage system 102 have a relatively higher ordering in the failover preferences 132. For instance, one secondary storage system may be in the same building, another in the same campus or facility, and a third in the same metropolitan area, etc.

The volumes $106_1, 106_2, 106_3$, and $106_n$, $108_1, 108_2, 108_3$, and $108_n$, $110_1, 110_2, 110_3$, and $110_n$, and $112_1, 112_2, 112_3$, and $112_n$ may represent volumes stored in one storage system 102, $104_1, 104_2, 104_3$, respectively, comprising a storage server or controller and one or more attached storage devices. In an alternative embodiment, the storage systems 102, $104_1, 104_2, 104_3$ may each be comprised of a plurality of storage sub-systems, wherein each subsystem comprises a server/controller and one or more attached storage devices, and wherein the volumes $106_1, 106_2, 106_3$, and $106_n$, $108_1, 108_2, 108_3$, and $108_n$, $110_1, 110_2, 110_3$, and $110_n$, and $112_1, 112_2, 112_3$, and $112_n$ in one of the storage systems 102, $104_1, 104_2, 104_3$ are distributed among the different storage sub-systems. The storage systems and storage sub-systems may be comprised of an enterprise storage controller/server suitable for managing access to attached storage devices, such as the International Business Machine Corporation's ("IBM") DS8000® storage system. (DS8000 is a registered trademark of IBM in countries throughout the world).

In further embodiments, the storage systems 102, $104_1, 104_2, 104_3$ may each comprise multiple storage systems, so that the primary storage system 102 may mirror its volumes to the different storage systems comprising each of the storage systems $104_1, 104_2, 104_3$.

In one embodiment, the replication manager 116 comprises a program for managing the mirroring of volumes across systems, such as the IBM mirroring programs Geographically Dispersed Parallel Sysplex® (GDPS)®, and Tivoli® Storage Productivity Center for Replication (TPC-R) that define a replication session and copy pairs 200. Different types of mirroring may be selected to copy the data, such as synchronous mirroring, asynchronous mirroring or point-in-time mirroring, or combinations of multiple of these different mirroring types. The failover manager 126 may comprise a program suitable for handling the failover of a primary storage system 102 to one of the secondary storage systems $104_1, 104_2, 104_3$, such as the IBM HyperSwap product which establishes failover sessions from the established copy pairs. (Geographically Dispersed Parallel Sysplex, GDPS, Tivoli, and HyperSwap are registered trademarks of IBM in countries throughout the world).

In alternative embodiments, the functionality described with respect to the replication manager 116 and failover manager 126 may be implemented in a single storage manager program or in multiple different program modules.

The network 114 may comprise a Storage Area Network (SAN), Local Area Network (LAN), Intranet, the Internet, Wide Area Network (WAN), peer-to-peer network, wireless network, arbitrated loop network, etc. The volumes may be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. Then storage devices in which the volumes are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

Figure 2:
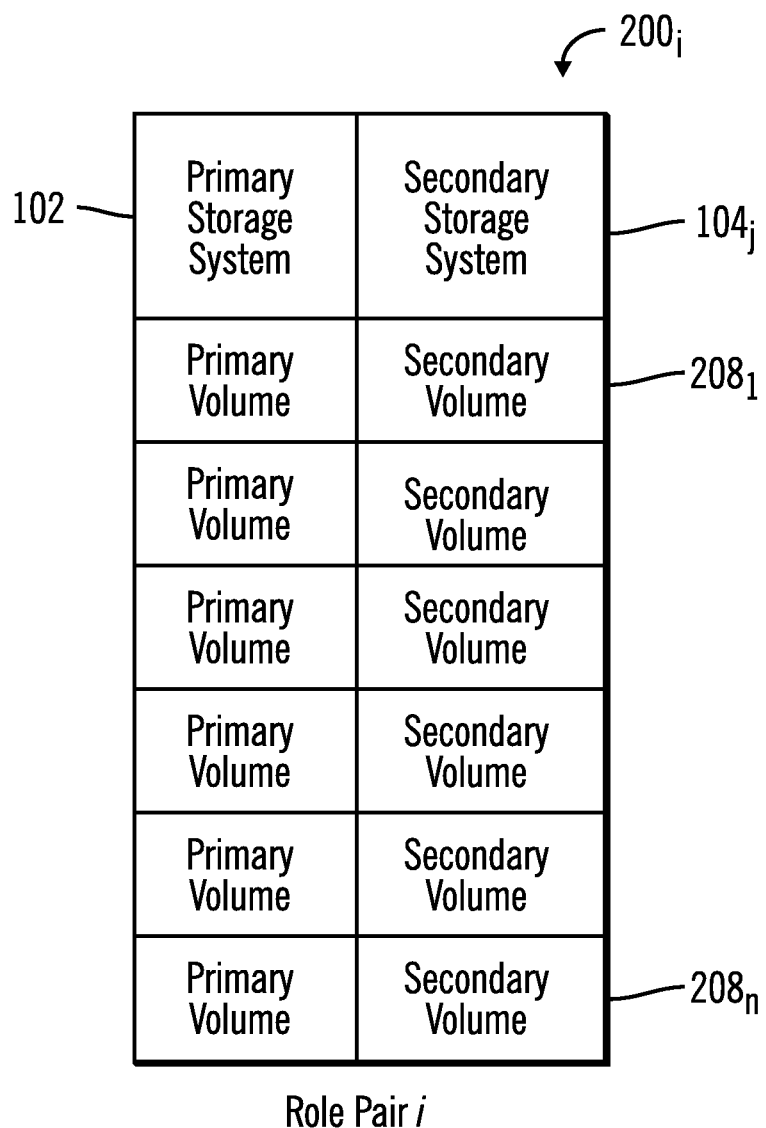
FIG. 2 illustrates an embodiment of an instance of a role pair.

FIG. 2 illustrates an embodiment of an instance of a role pair $200_i$ of the role pairs 200 that identifies secondary volumes in a secondary storage system $104_j$ comprising one of the secondary storage systems $104_1, 104_2, 104_3$ to which the volumes of the primary storage system 102 are copied. The role pair $200_i$ specifies copy pairs $208_1 \ldots 208_n$, where there is one copy pair for each primary volume $106_1, 106_2, 106_3$, and $106_n$ and each of the secondary volumes $108_1, 108_2, 108_3, 108_n$, $110_1, 110_2, 110_3$, and $110_n$, or $112_1, 112_2, 112_3$, and $112_n$ to which each of the primary volumes is copied. If the secondary storage system $104j$ is comprised of a plurality of storage sub-systems, i.e., controllers, servers, etc., then the copy pairs $208_1 \ldots 208_n$ may specify the secondary storage sub-system in which the secondary volume is included.

Figure 3:
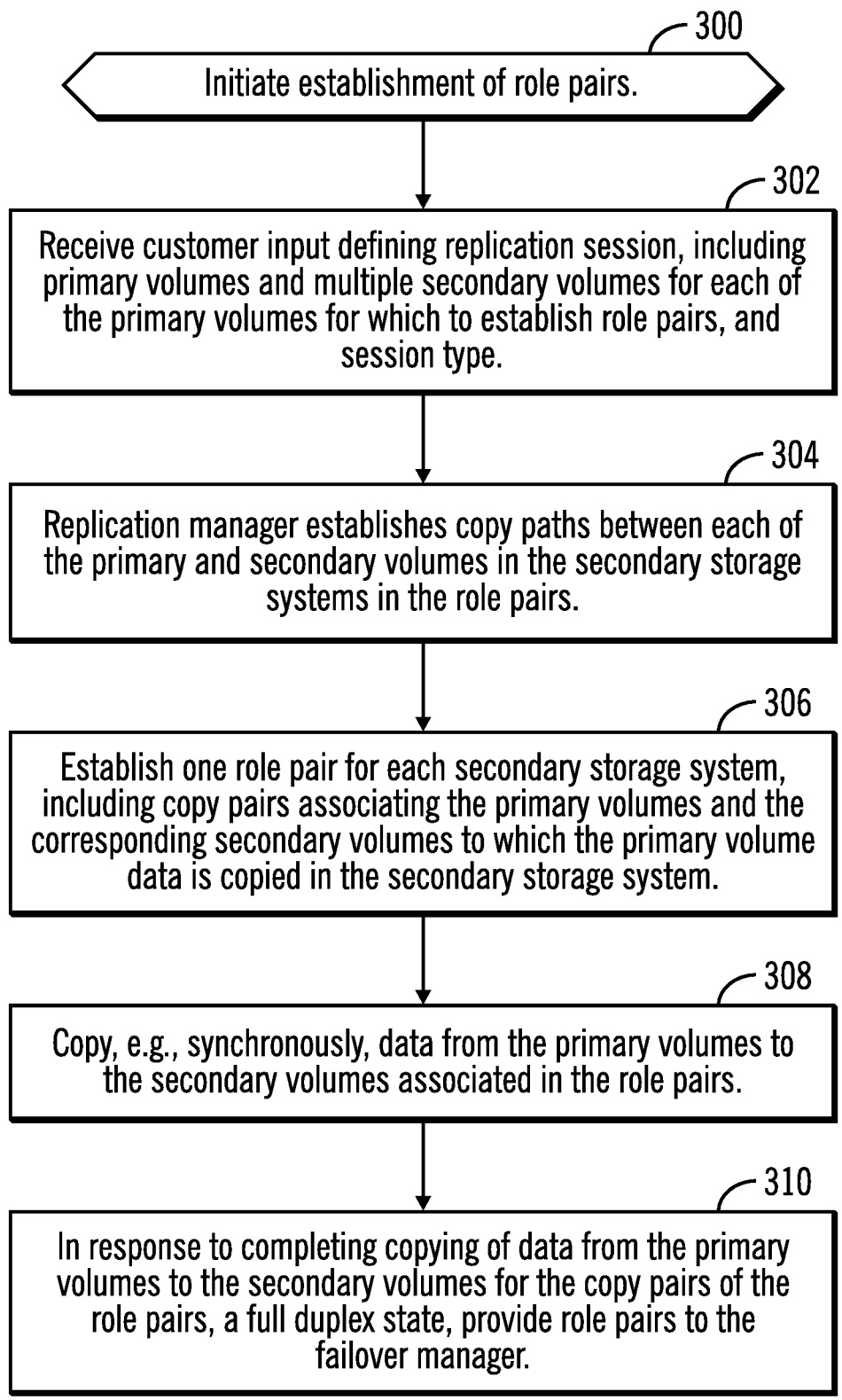
FIG. 3 illustrates an embodiment of operations to establish a role pair.

In one embodiment, the hosts 100, 150 may include a channel subsystem, which has sub-channels that provide the information needed to access the underlying storage devices in which the volumes are configured. The host 100, 150 operating systems may include Unit Control Blocks (UCBs) that provide a software representation of the underlying volumes, and point to the sub-channel that has the information on how to access the device including the volume addressed by the UCB. When an application allocates a volume, such as volumes $106_1, 106_2, 106_3, 106_n, 108_1, 108_2, 108_3, 108_n, 110_1, 110_2, 110_3$, and $110_n$, or $112_1, 112_2, 112_3$, and $112_n$, a UCB may be allocated for the volume including information on the sub-channel used to access the device in which the volume is included. Applications use the UCBs to access the volume When performing a failover or Hyperswap, the UCB contents of the primary and secondary volumes being swapped are swapped so that the UCB for the primary volume points to the secondary volume and the UCB for the secondary volume points to the primary volume. If the failover or swap resulted from a failure at the primary volume, then the UCB for the secondary volume may point to a primary volume that is not accessible after the swap. Thus, swapping the UCBs physical addressing information (i.e. subchannel number) from the primary to the secondary device redirects the application's I/O requests to the secondary device FIG. 3 illustrates an embodiment of operations performed by the replication manager 116 to establish the role pairs 200 for a failover session 130. Upon initiating (at block 300) operations to establish role pairs 200, the replication manager 116 receives (at block 302) customer input defining a replication session 140, including a primary storage system 102 including primary volumes $106_1, 106_2, 106_3$, and $106_n$, to replicate to multiple secondary storage systems $104_1, 104_2, 104_3$, including secondary volumes $108_1, 108_2, 108_3$, and $108_n, 110_1, 110_2, 110_3$, and $110_n$, and $112_1, 112_2, 112_3$, and $112_n$ for which to establish role pairs 200, and a session type. In one embodiment, the session type may comprise synchronous type copy operation or non-synchronous copy types, such as asynchronous, point-in-time, etc. When the customer has completed selecting all of the primary and secondary volumes in the secondary storage systems $104_1, 104_2, 104_3$ to include in the role pairs 200 for the replication session, the customer may invoke the replication manager 116 to establish the replication copies.

The replication manager 116 establishes (at block 304) paths $120_1, 120_2, 120_3 \ldots 122_n, 122_1, 122_2, 122_3 \ldots 122_n$, and $124_1, 124_2, 124_3 \ldots 124_n$ between each of the primary and secondary volumes in the secondary storage systems identified in the role pairs 200. The replication manager 116 establishes (at block 306) one role pair 200 for each of the secondary storage systems $104_1, 104_2, 104_3$, including a plurality of copy pairs $208_1 \ldots 208_n$ associating the primary volumes and the corresponding secondary volumes to which the primary volume data is copied in the secondary storage system. After establishing the role pairs 200, the storage controller 102 begins copying (at block 308) using the user specified copy type, e.g., synchronous, data from the primary volumes to the secondary volumes associated in the created role pairs 200, so that the primary volumes are copied to corresponding secondary volumes in multiple of the secondary storage systems $104_1, 104_2, 104_3$ identified in the role pairs 200.

In response to completing copying of data from the primary volumes to the secondary volumes for the copy pairs $208_1 \ldots 208_n$ of the role pairs 200, i.e., a full duplex state, provide (at block 310) the role pairs 200 to the failover manager 126 to use to create a failover session 130 to enable failover from the primary storage system 102 to the secondary storage system $104_i$ for the role pairs 200. Copying of updates from the primary volumes to the secondary volumes may continue after the full duplex state is established.

Figure 4:
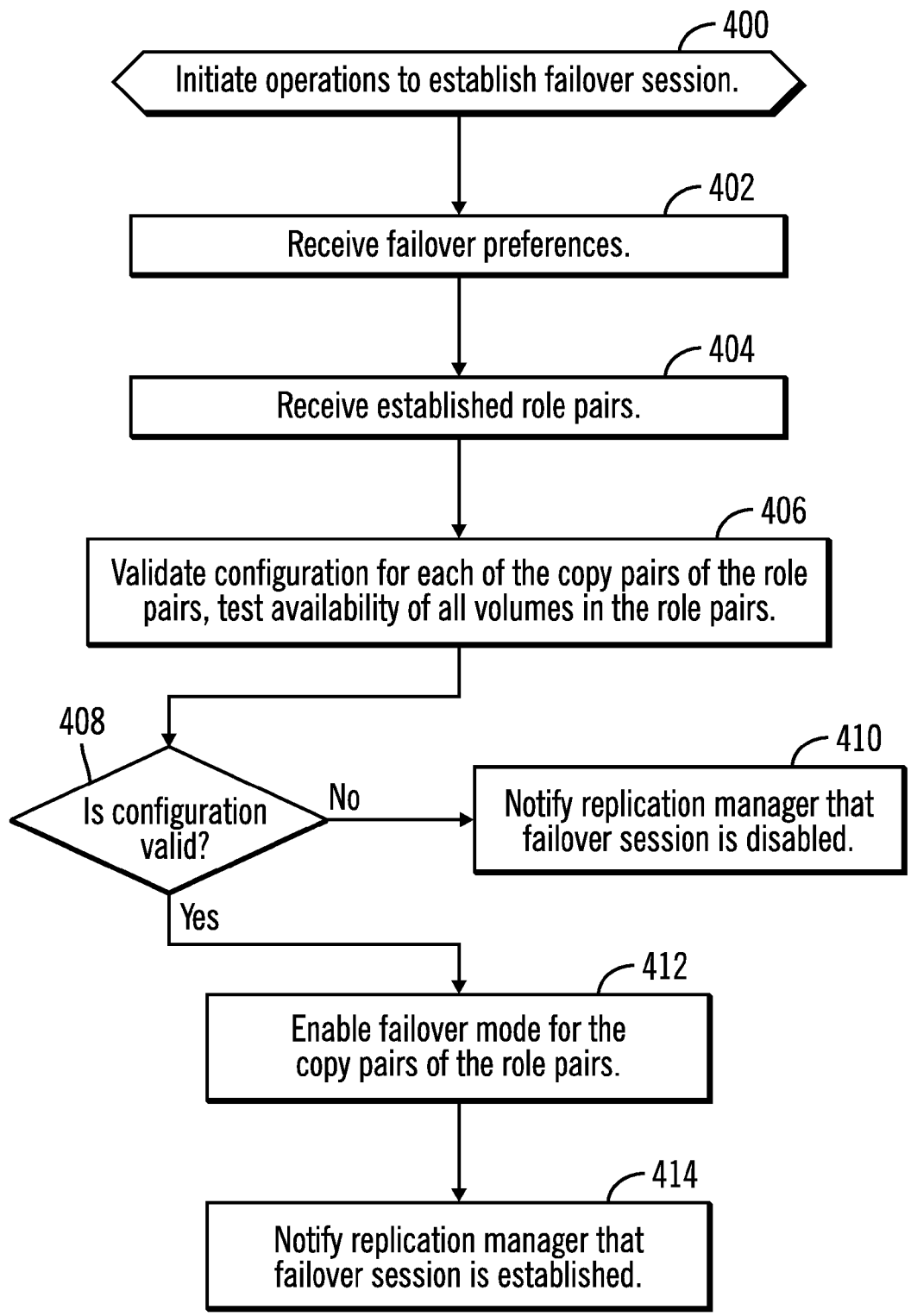
FIG. 4 illustrates an embodiment of operations to establish a failover session.

FIG. 4 illustrates an embodiment of operations performed by the failover manager 126 to establish a failover session 130 for the received role pairs 200. Upon initiating (at block 400) the operation to establish the failover session 130, the failover manager 126 receives (at block 402) failover preferences 132 indicating an ordering of the secondary storage systems $104_1, 104_2, 104_3$, in which they should be selected for failover if the primary storage system 102 fails. The failover manager 126 further receives (at block 404) the established role pairs 200, one for each of the secondary storage systems $104_1, 104_2, 104_3$, to include in the failover session 130. The configuration of the copy pairs $208_1 \ldots 208_n$ of the role pairs 200 is validated (at block 406) by testing the availability and accessibility of all the volumes in the copy pairs $208_1 \ldots 208_n$ of the role pair 200s. If (at block 408) the configuration is not valid, then the failover manager 126 notifies (at block 410) the replication manager 116 that the failover session is disabled. If (at block 408) the configuration is valid, then failover mode is enabled (at block 412) for the failover session 130 and the copy pairs $208_1 \ldots 208_n$ of the received role pairs 200. The replication manager 116 is notified (at block 414) that the failover session 130 has been established.

Figure 5:
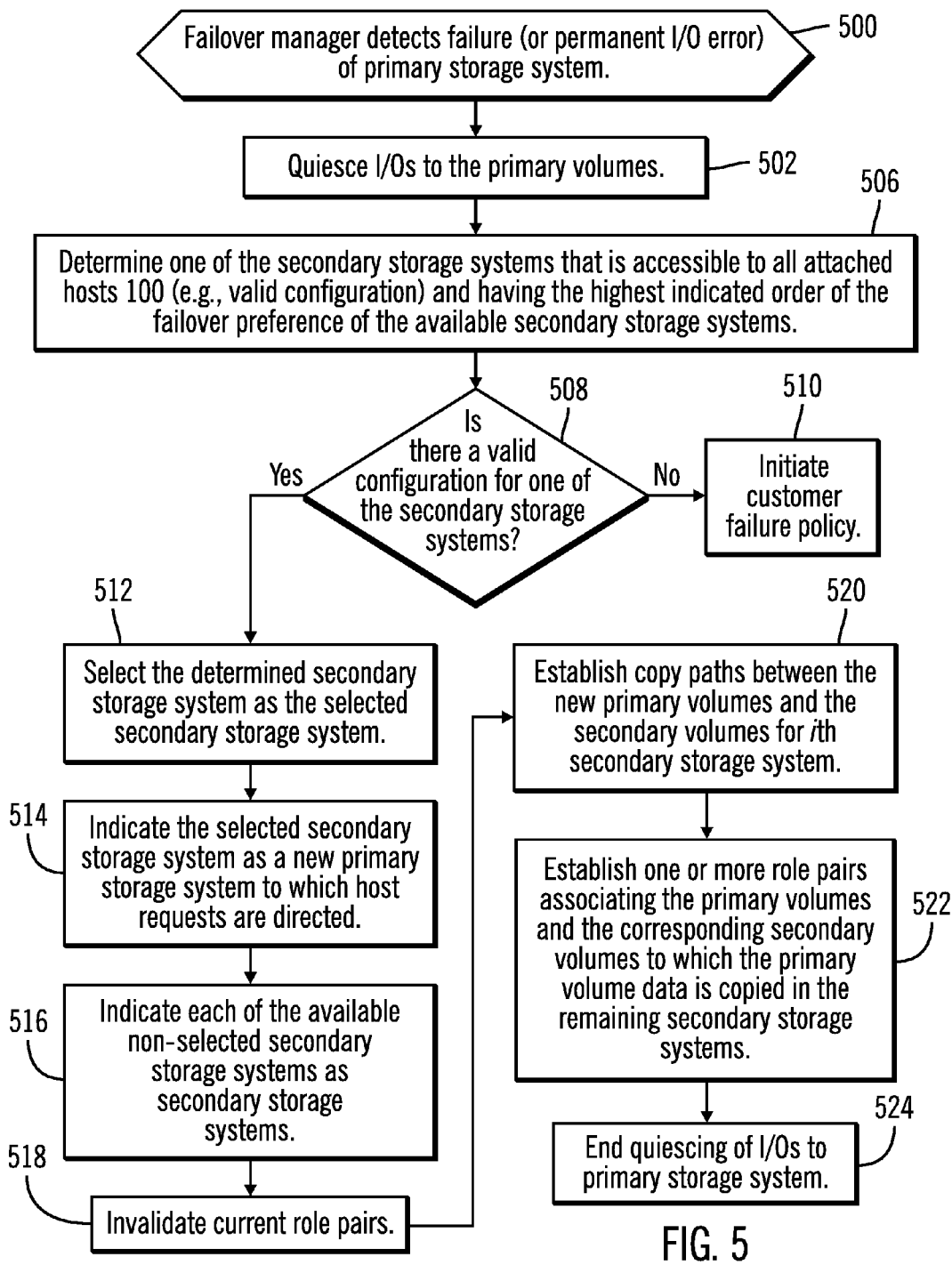
FIG. 5 illustrates an embodiment of operations to perform a failover.

FIG. 5 illustrates an embodiment of operations performed by the failover manager 126 to handle a failover from the primary storage system 102 to one of the secondary storage systems $104_1, 104_2, 104_3$. Upon (at block 500) the failover manager 126 detecting a failure (or permanent I/O error) of a primary storage system 102 being managed in a failover session 130, the failover manager 126 quiesces (at block 502) Input/Output (I/O) requests to the primary volumes $106_1, 106_2, 106_3$, and $106_n$ from the host 100 and other host systems 150. The failover manager 126 determines (at block 506) one of the secondary storage systems $104_1, 104_2, 104_3$ that is accessible and available (e.g., valid configuration) to all the hosts 100, 150 and having the highest indicated order of the failover preferences 132 of the available secondary storage systems $104_1, 104_2, 104_3$. The failover manager 126 may cycle through the failover preferences 132 starting from the most preferred secondary storage system $104_1, 104_2, 104_3$ until a most preferred secondary storage system that is available to all hosts 100, 150 is determined. If (at block 508) there is no secondary storage system $104_1, 104_2, 104_3$ that is available and accessible to all hosts 100, then a customer failure policy is initiated (at block 510). The failure policy may partition the host systems 100, 150 out of the sysplex that cannot access the selected secondary storage system in order to "save" the other host systems 100, 150 or, alternatively, the customer failure policy may indicate to terminate and back-out the failover session 130.

If (at block 508) there is a valid configuration for one of the preferred secondary storage systems $104_1, 104_2, 104_3$, then the failover manager 126 selects (at block 512) the determined secondary storage system $104_1, 104_2, 104_3$ as the selected secondary storage system and indicates (at block 514) the selected secondary storage system as a new primary storage system to which host 100, 150 requests are directed. This indication may be made by updating the primary 134 and secondary 136 information. The failover manager 126 may indicate (at block 516) each of the available non-selected secondary storage systems as secondary storage systems, such as by updating the secondary storage information 400 for each of the non-selected secondary storage systems that will continue to function as secondary storages or targets of the mirroring from the new primary.

The failover manager 126 may invalidate (at block 518) the current role pairs 200 for the failover session 130 to replace with new established role pairs 200 having copy pairs for the remaining secondary storage systems. The failover manager 126 (or replication manager 116, which may be called by the failover manager 126) establishes (at block 520) copy paths between the new primary volumes and the secondary volumes in the ith secondary storage system. The failover manager 126 establishes (at block 522) role pairs 200 including copy pairs 208, associating the primary volumes of the new primary storage system and the corresponding secondary volumes to which the primary volume data is copied in the remaining secondary storage systems. After reestablishing copy paths and the role pairs 200 from the new primary storage system to the remaining secondary storage systems, the failover manager 130 ends (at block 524) quiescing I/Os to the primary storage system and allows I/Os to proceed directed to the new primary storage system.

Figure 6:
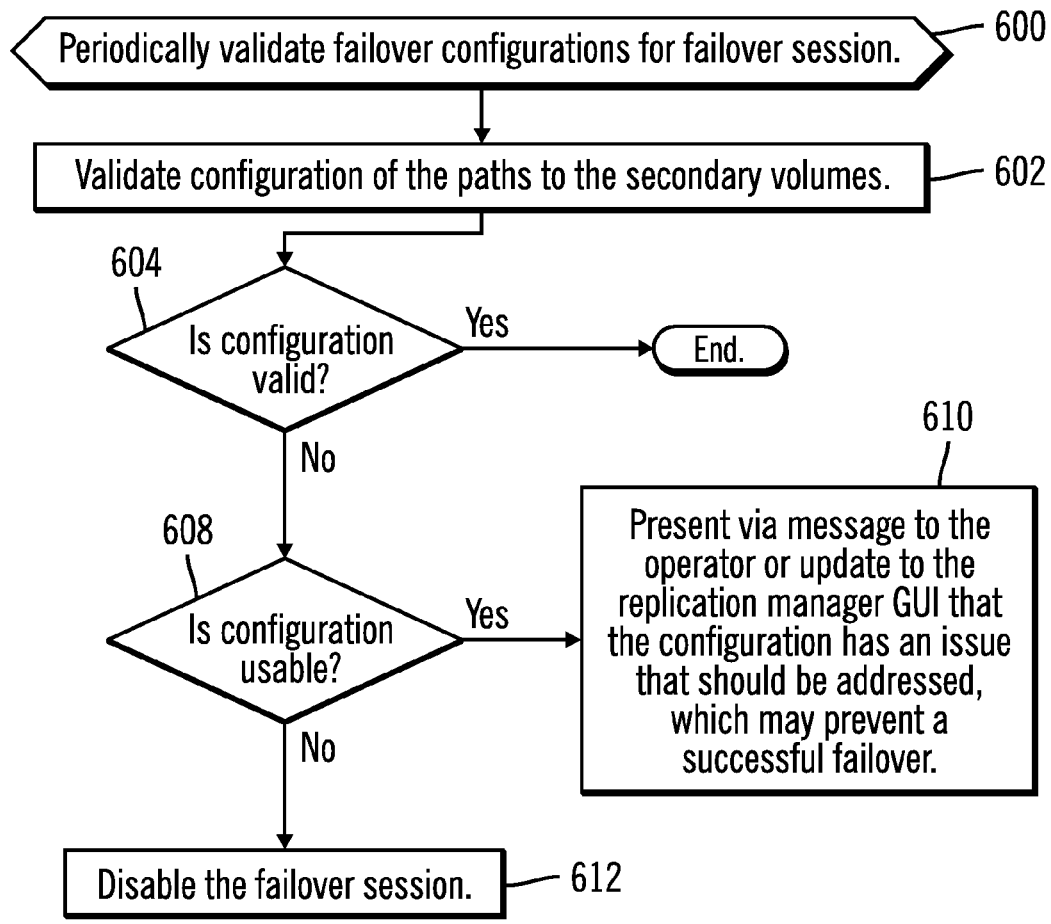
FIG. 6 illustrates an embodiment of operations to validate configurations in a failover session.

FIG. 6 illustrates an embodiment of operations performed by the failover manager 126 to periodically check the health of the secondary storage systems available in the failover session 130. Upon (at block 600) periodically validating the configurations for the failover session 130, the failover manager 126 validates the configuration of the paths 114 to the secondary volumes in the secondary storage systems, such as by issuing a trivial I/O request to the secondary volumes to determine their availability. If (at block 604) the configuration is not valid, i.e., all copy paths and secondary storage systems are not available, then a determination is made (at block 608) whether the configuration is degraded. A degraded state occurs when one or more hosts 100, 150 cannot access one or more of the secondary volumes in one or more of the secondary storage systems $104_1, 104_2, 104_3$, while other of the hosts 100, 150 can access all of the secondary storage system volumes. If (at block 608) the configuration is usable, then the configuration which is also not valid at this point is degraded. In such case, a message is presented (at block 610) to the operator or update to the replication manager interface that the configuration has an issue that should be addressed, which may prevent a successful failover. This message is to encourage the administrator to correct the issue before a failover occurs. In a further scenario, the degraded state may involve one or more hosts 100, 150 unable to access volumes in only one of the secondary storage systems $104_1, 104_2, 104_3$. In such case, the administrator may still be alerted even though failover could successfully occur for at least one of the other secondary storage systems whose volumes are accessible to all of the hosts 100, 150. If upon a next monitoring operation or configuration check, the problem is fixed, then the alert may be cleared. Further, before a failover operation, a configuration check may be performed to clear the alert before the failover is performed.

If (at block 608) the configuration is not usable, at which point it is also not valid, then the failover session 130 is disabled (at block 612). Further, if the configuration is valid (from the yes branch of block 604), control ends. With the embodiment of FIG. 6, a failover session is disabled when all systems in the sysplex fail validation (for whatever reasons). A session is degraded as long as at least one system can access all secondary volumes. In this way, the session is disabled if no one system will survive and degrade if at least one system survives.

Figure 7:
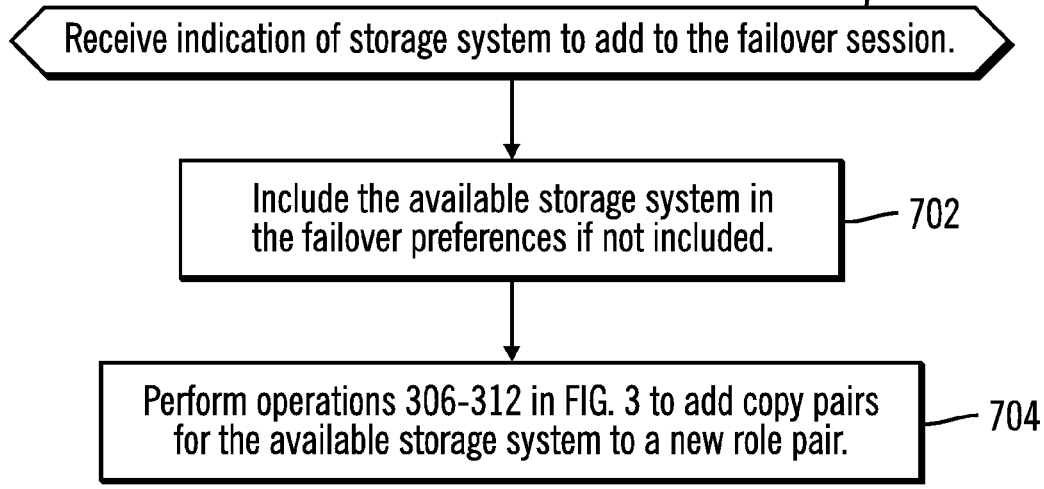
FIG. 7 illustrates an embodiment of operations to add a storage system to a failover session.

FIG. 7 illustrates an embodiment of operations performed by the failover manager 126 or replication manager 116 to add a new storage system as a secondary storage system to an existing failover session 130, which may comprise a repaired primary or secondary storage system previously removed from the failover session 130 or a new storage system. Upon receiving (at block 700) indication of a storage system to add to the failover session 130, the failover manager 130 may include (at block 702), automatically or in response to customer input, the added storage system in the failover preferences 132. For instance, if the added storage system is the repaired old primary storage system removed due to a failure, it may be added back to the failover preferences 132 with a highest preference in the order. The operations at blocks 306-312 in FIG. 3 may be performed to establish the copy paths and copy pairs for the new secondary storage system to add to a new roll pair 200 to provide to the failover session 130. The operations to add the copy pairs for the added storage system may be performed by establishing a new role pair as shown in FIG. 3 and copying the primary data to establish the duplex state for the added secondary storage system.

The described embodiments provide techniques to mirror primary volumes to secondary volumes at multiple remote target secondary storage systems by maintaining copy pairs between the primary volumes and the secondary volumes in each of the secondary storage systems. Upon detecting a failover at the primary storage system, one of the secondary storage systems may be selected to be the new primary and the remaining secondary storage systems are then configured to be the new secondary storage systems to the new primary storage system, comprising the selected secondary storage system. Described embodiments provide multiple levels of protection by avoiding a single point of failure such as the case if there is only one secondary storage system. The described embodiments increase the likelihood of the system surviving a primary storage failure if the target secondary storage system is not available, thus providing greater system availability.

The reference characters used herein, such as i and n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
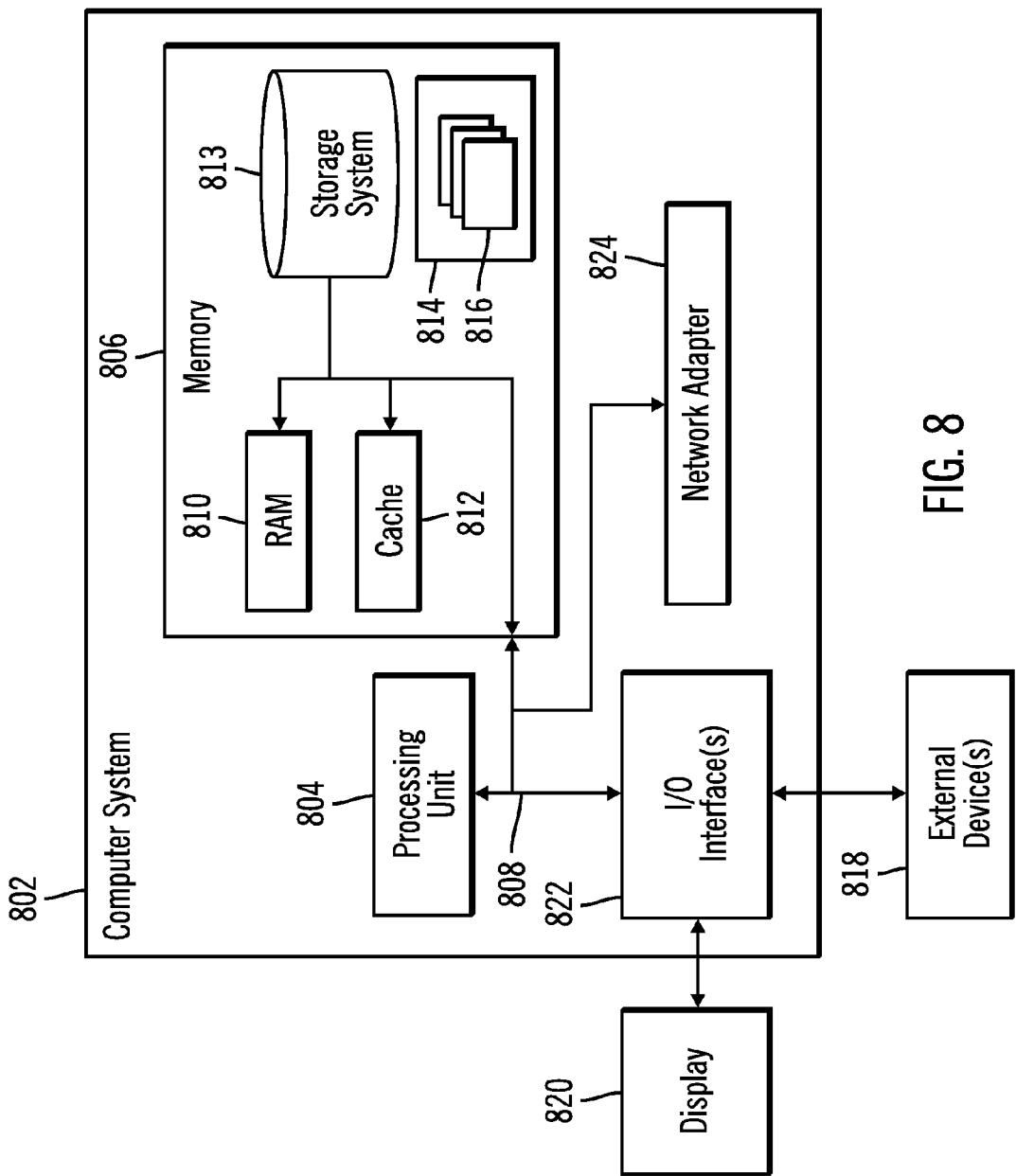
FIG. 8 illustrates a computing environment in which the components of FIG. 1 may be implemented.

The computational components of FIG. 1, including the hosts 100, 150, primary storage system 102, and secondary storage systems $104_1$, $104_2$, $104_3$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining a relationship between a primary storage system and a plurality of secondary storage systems, wherein the computer program product comprises a computer readable storage medium having program instructions embodied therewith, the program instructions executable by a processor to cause operations, the operations comprising:

establishing a plurality of copy pairs, where each of the copy pairs associates one of a plurality of primary volumes in the primary storage system with one of a plurality of secondary volumes in one of the secondary storage systems, wherein there is one copy pair for each of the primary volumes and each of the secondary volumes in each of the secondary storage systems to which a primary volume is copied, and wherein there are multiple copy pairs for one of the primary volumes to copy to multiple secondary volumes in multiple of the secondary storage systems;

for each of the copy pairs from one of the primary volumes to one of the secondary volumes in one of the secondary storage systems, mirroring data from the primary volume of the copy pair in the primary storage system to the associated secondary volume in the secondary storage system in the copy pair;

detecting a failure at the primary storage system;
selecting a secondary storage system of the secondary storage systems in response to detecting the failure, wherein a plurality of the secondary storage systems are available for selection;
indicating the selected secondary storage system as a new primary storage system to which host requests are directed; and
establishing a plurality of new copy pairs associating volumes in the new primary storage system as new primary volumes to the secondary volumes in available of the secondary storage systems other than the new primary storage system.

2. The computer program product of claim 1, wherein the operations further comprise:
maintaining an indicated order of preference of selecting the secondary storage systems, wherein selecting the selected secondary storage system comprises determining one of the secondary storage systems that is available to connected hosts and has a highest indicated order of preference of the available secondary storage systems, wherein the determined secondary storage system comprises the selected secondary storage system.

3. The computer program product of claim 1, wherein the mirroring of data from the primary volumes to the secondary volumes in each of the secondary storage systems comprises synchronously copying modified data from the primary volumes to the secondary volumes in the secondary storage systems, and wherein each of the copy pairs are established in response to the associated secondary volume in the copy pair having a full copy of the data at the primary volume.

4. The computer program product of claim 3, wherein a replication manager performs the operations of establishing the copy pairs, wherein the operations further comprise:
sending, by the replication manager, information on the copy pairs to a failover manager in response to establishing the copy pairs, wherein the failover manager performs the operations of detecting the failure at the primary storage system and selecting the selected secondary storage system;
validating, by the failover manager, a configuration of the copy pairs by testing an availability of the primary and secondary storage systems in the copy pairs;
communicating, by the failover manager, to the replication manager that a failover session is enabled in response to validating the configuration; and
communicating, by the failover manager, to the replication manager that the failover session is in a disabled state in response to failing validation of the configuration.

5. The computer program product of claim 4, wherein the operations further comprise:
periodically checking, by the failover manager, whether the configuration of the copy pairs is valid;
determining that one of the secondary storage systems includes storage devices in the copy pair that are unavailable; and
indicating that the determined secondary storage system is not part of the failover session.

6. The computer program product of claim 1, wherein the operations further comprise:
determining that the primary storage system that experienced the failure is available; and
establishing a copy pair associating primary volumes in the new primary storage system with volumes in the primary storage system that experienced the failure as a new secondary storage system.

7. The computer program product of claim 1, wherein the operations further comprise:
establishing copy paths between each of the primary volumes to the associated secondary volumes in the copy pairs, wherein the data is mirrored on the copy paths from the primary volumes to the secondary volumes; and
establishing new copy paths between each of the new primary volumes to the associated secondary volumes in the new copy pairs.

8. A system for maintaining a relationship between a primary storage system and a plurality of secondary storage systems, comprising:
a processor; and
a computer readable storage medium having program instructions embodied therewith, the program instructions executable by a processor to cause operations, the operations comprising:
establishing a plurality of copy pairs, where each of the copy pairs associates one of a plurality of primary volumes in the primary storage system with one of a plurality of secondary volumes in one of the secondary storage systems, wherein there is one copy pair for each of the primary volumes and each of the secondary volumes in each of the secondary storage systems to which a primary volume is copied, and wherein there are multiple copy pairs for one of the primary volumes to copy to multiple secondary volumes in multiple of the secondary storage systems;
for each of the copy pairs from one of the primary volumes to one of the secondary volumes in one of the secondary storage systems, mirroring data from the primary volume of the copy pair in the primary storage system to the associated secondary volume in the secondary storage system in the copy pair;
detecting a failure at the primary storage system;
selecting a secondary storage system of the secondary storage systems in response to detecting the failure, wherein a plurality of the secondary storage systems are available for selection;
indicating the selected secondary storage system as a new primary storage system to which host requests are directed; and
establishing a plurality of new copy pairs associating volumes in the new primary storage system as new primary volumes to the secondary volumes in available of the secondary storage systems other than the new primary storage system.

9. The system of claim 8, wherein the operations further comprise:
maintaining an indicated order of preference of selecting the secondary storage systems, wherein selecting the selected secondary storage system comprises determining one of the secondary storage systems that is available to connected hosts and has a highest indicated order of preference of the available secondary storage systems, wherein the determined secondary storage system comprises the selected secondary storage system.

10. The system of claim 8, wherein the mirroring of data from the primary volumes to the secondary volumes in each of the secondary storage systems comprises synchronously copying modified data from the primary volumes to the secondary volumes in the secondary storage systems, and wherein each of the copy pairs are established in response to the associated secondary volume in the copy pair having a full copy of the data at the primary volume.

11. The system of claim 10, wherein a replication manager performs the operations of establishing the copy pairs, wherein the operations further comprise:
   sending, by the replication manager, information on the copy pairs to a failover manager in response to establishing the copy pairs, wherein the failover manager performs the operations of detecting the failure at the primary storage system and selecting the selected secondary storage system;
   validating, by the failover manager, a configuration of the copy pairs by testing an availability of the primary and secondary storage systems in the copy pairs;
   communicating, by the failover manager, to the replication manager that a failover session is enabled in response to validating the configuration; and
   communicating, by the failover manager, to the replication manager that the failover session is in a disabled state in response to failing validation of the configuration.

12. The system of claim 8, wherein the operations further comprise:
   establishing copy paths between each of the primary volumes to the associated secondary volumes in the copy pairs, wherein the data is mirrored on the copy paths from the primary volumes to the secondary volumes; and
   establishing new copy paths between each of the new primary volumes to the associated secondary volumes in the new copy pairs.

13. A method for maintaining a relationship between a primary storage system and a plurality of secondary storage systems, comprising:
   establishing a plurality of copy pairs, where each of the copy pairs associates one of a plurality of primary volumes in the primary storage system with one of a plurality of secondary volumes in one of the secondary storage systems, wherein there is one copy pair for each of the primary volumes and each of the secondary volumes in each of the secondary storage systems to which a primary volume is copied, and wherein there are multiple copy pairs for one of the primary volumes to copy to multiple secondary volumes in multiple of the secondary storage systems;
   for each of the copy pairs from one of the primary volumes to one of the secondary volumes in one of the secondary storage systems, mirroring data from the primary volume of the copy pair in the primary storage system to the associated secondary volume in the secondary storage system in the copy pair;
   detecting a failure at the primary storage system;
   selecting a secondary storage system of the secondary storage systems in response to detecting the failure, wherein a plurality of the secondary storage systems are available for selection;
   indicating the selected secondary storage system as a new primary storage system to which host requests are directed; and
   establishing a plurality of new copy pairs associating volumes in the new primary storage system as new primary volumes to the secondary volumes in available of the secondary storage systems other than the new primary storage system.

14. The method of claim 13, further comprising:
   maintaining an indicated order of preference of selecting the secondary storage systems, wherein selecting the selected secondary storage system comprises determining one of the secondary storage systems that is available to connected hosts and has a highest indicated order of preference of the available secondary storage systems, wherein the determined secondary storage system comprises the selected secondary storage system.

15. The method of claim 13, wherein the mirroring of data from the primary storage system to each of the secondary storage systems comprises synchronously copying modified data from the primary storage system to the secondary storage systems, and wherein each of the copy pairs are established in response to the associated secondary storage in the copy pair having a full copy of the data at the primary storage system.

16. The method of claim 15, wherein a replication manager performs the establishing the copy pairs, further comprising:
   sending, by the replication manager, information on the copy pairs to a failover manager in response to establishing the copy pairs, wherein the failover manager performs the detecting the failure at the primary storage system and selecting the selected secondary storage system;
   validating, by the failover manager, a configuration of the copy pairs by testing an availability of the primary and secondary storage systems in the copy pairs;
   communicating, by the failover manager, to the replication manager that a failover session is enabled in response to validating the configuration; and
   communicating, by the failover manager, to the replication manager that the failover session is in a disabled state in response to failing validation of the configuration.

17. The method of claim 13, wherein the operations further comprise:
   establishing copy paths between each of the primary volumes to the associated secondary volumes in the copy pairs, wherein the data is mirrored on the copy paths from the primary volumes to the secondary volumes; and
   establishing new copy paths between each of the new primary volumes to the associated secondary volumes in the new copy pairs.

* * * * *